United States Patent [19]

Palmer

[11] Patent Number: 5,564,817
[45] Date of Patent: Oct. 15, 1996

[54] BRACKET ASSEMBLY FOR MOUNTING A LIGHT TO A NIGHT VISION DEVICE

[75] Inventor: Gary L. Palmer, Vinton, Va.

[73] Assignee: ITT Corporation, New York, N.Y.

[21] Appl. No.: 418,180

[22] Filed: Apr. 6, 1995

[51] Int. Cl.⁶ .................................................. F21L 7/00
[52] U.S. Cl. .......................... 362/191; 362/7; 362/396; 362/414; 248/231.21; 396/529; 396/544
[58] Field of Search ........................ 362/3, 7–9, 11, 362/12, 16, 18, 109, 190, 191, 208, 253, 396, 410, 414; 354/126, 141, 145.1, 149.1, 286, 295; 33/241; 248/122.1, 220.41, 230.1, 231.21

[56] References Cited

U.S. PATENT DOCUMENTS

| | | | |
|---|---|---|---|
| 1,735,212 | 11/1929 | Pawsat | 362/396 |
| 2,529,057 | 11/1950 | Teffault | 33/241 |
| 3,067,664 | 12/1962 | Winslow | 354/295 |
| 3,650,195 | 3/1972 | Jones | 354/126 |
| 3,688,662 | 9/1972 | Smith | 354/126 |
| 3,873,823 | 3/1975 | Northrup et al. | 362/396 |
| 4,030,114 | 6/1977 | Telfer | 362/3 |
| 4,123,026 | 10/1978 | Michio | 354/126 |
| 4,707,772 | 11/1987 | Jimenez et al. | 362/191 |
| 4,987,433 | 1/1991 | Gandrud | 354/145.1 |
| 5,394,207 | 2/1995 | Fujisaki | 354/286 |

*Primary Examiner*—Denise L. Gromada
*Assistant Examiner*—Alan B. Cariaso
*Attorney, Agent, or Firm*—Plevy & Associates; Patrick M. Hogan

[57] ABSTRACT

A mounting bracket assembly that enables a flashlight to be retroactively coupled to an optical device such as a night vision scope. The mounting bracket assembly includes an adaptor that engages the housing of the optical device proximate the objective lens of the optical device. A bracket is provided that clamps around the adaptor, whereby the adaptor rigidly joins the bracket to the optical device. An aperture is formed through a section of the bracket. The aperture is sized to receive and retain the cylindrical body of a flashlight with an interference fit, thereby coupling the flashlight to the optical device. A threaded bore is disposed at the bottom of the bracket. The threaded bore is sized to receive the threaded connector of a tripod or other similar static support. As a result, by coupling the bracket to a tripod or similar static support, the entire optical device can be supported.

14 Claims, 2 Drawing Sheets

BRACKET ASSEMBLY FOR MOUNTING A LIGHT TO A NIGHT VISION DEVICE

FIELD OF THE INVENTION

The present invention relates to a bracket assemblies that couple a flashlight or similar illuminating device to a night vision device. More particularly, the present invention relates to a bracket assembly that engages the objective lens assembly of a night vision device or a supplemental attachment to such an objective lens assembly and provides a means for the attachment of both an illuminator device and a tripod support to the night vision device.

BACKGROUND OF THE INVENTION

Night vision devices have long been used in the military to provide soldiers, aviators and sailors with the ability to view objects at night or during other low light conditions. As the military demands for night vision devices wane, manufacturers of night vision devices are starting to produce commercial products for sale to the general public. Although some of the more sophisticated night vision devices have true infrared viewing capabilities, most of the moderately prices night vision devices operate in the visible and near-infrared regions of the spectrum. Such night vision devices are commonly called star scopes because they require some light (i.e. star light) to operate.

Star scope-type night vision devices direct low intensity light (i.e. star light) through an image intensifier tube that converts the photons to electrons and multiplies the intensity of the electrons several thousand times. The electrons impinge upon a phosphor screen, wherein a visible image is produced, thereby providing some degree of night vision.

The problem typically associated with star scope type night vision devices is that they do require some ambient light to operate. Indoors and on overcast nights where there is no ambient light, star scope type night vision devices produce very limited night vision capabilities. To improve the night vision capabilities of star scope night vision devices, many such night vision devices have illuminators built into their structures. As a result, in conditions of no ambient light, the illuminator of the night vision device is capable of producing its own light, which is subsequently amplified by the night vision device and convened into a visible image.

To conserve space and limit bulk, night vision devices with integral light source often have a single power supply. Consequently, the use of the illuminator drains the power reserves of the night vision device and greatly shortens the operating period of the device.

In an attempt to make star scope type night vision devices less complicated and less expensive, adaptor brackets have been developed that enable ordinary flashlights to be coupled to the night vision device. The flashlights contain there own batteries and may have a filter that produces a monochromatic output. Consequently, they are capable of illuminating an area without draining the electrical supply of the night vision device.

An example of a mounting bracket for mounting a flashlight illuminator onto a night vision device is shown in co-pending U.S. patent application Ser. No. 08/215,512, filed Mar. 22, 1994 entitled ILLUMINATOR BRACKET FOR A NIGHT VISION DEVICE, and assigned to ITT, the assignee herein.

Many night vision devices are formed as goggle assemblies or as binoculars and do not have a bottom mount that enable these devices to be attached to a tripod or a similar static support. Since many night vision devices require a means for coupling a separate illuminator to the night vision device and a means for joining a static support to the night vision device, it is therefor an objective of the present invention to provide a single bracket assembly that supplies both a coupling for a separate illuminator and a means for attaching the night vision device to a static support.

SUMMARY OF THE INVENTION

The present invention is a mounting bracket assembly that enables a flashlight to be retroactively coupled to an optical device such as a night vision scope. The mounting bracket assembly includes an adaptor that engages the housing of the optical device proximate the objective lens of the optical device. A bracket is provided that clamps around the adaptor, whereby the adaptor rigidly joins the bracket to the optical device. An aperture is formed through a section of the bracket. The aperture is sized to receive and retain the cylindrical body of a flashlight with an interference fit, thereby coupling the flashlight to the optical device.

A threaded bore is disposed at the bottom of the bracket. The threaded bore is sized to receive the threaded connector of a tripod or other similar static support. As a result, by coupling the bracket to a tripod or similar static support, the entire optical device can be supported.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PREFERRED EMBODIMENT

Although the present invention bracket assembly can be used to couple a flashlight to a variety of optical devices, such as cameras, video recorders and the like, the present invention bracket is especially suited to couple a flashlight to a night vision device. Accordingly, the present invention bracket will be described in conjunction with a night vision device in order to set forth the best mode of the invention.

Figure 1:
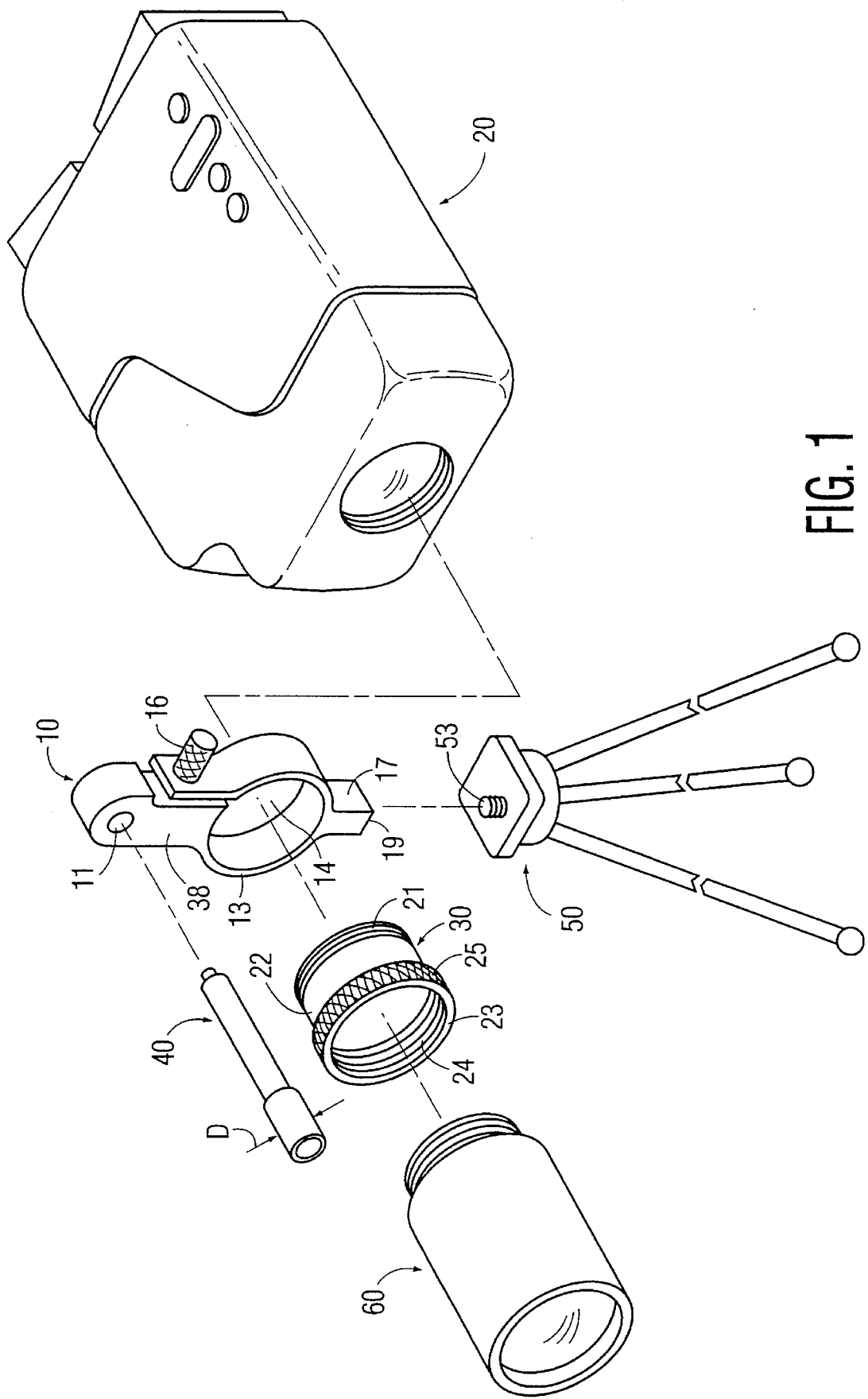
FIG. 1 is a perspective view of the present invention bracket assembly shown in conjunction with a night vision device, tripod and flashlight to promote further consideration and discussion.

Referring to FIG. 1, the present invention bracket assembly 10 is shown in conjunction with a night vision device 20, a T-adaptor 30, a small flashlight 40 and a tripod 50, wherein the bracket assembly 10 engages the T-adaptor 30, flashlight 40 and tripod 50. Also shown is an option optical attachment 60, that may be attached to the T-adaptor 30. In the shown embodiment, the night vision device is a set of night vision binoculars model F5200A manufactured by ITT Corp, the assignee herein and sold commercially under the brand names NIGHT MARINER™, NIGHT RANGER™ and NIGHT ENFORCER™. A preferred embodiment of the night vision binoculars is described in co-pending U.S. patent application Ser. No. 08/152,193 filed Nov. 12, 1993, now U.S. Pat. No. 5,471,374 entitled NIGHT VISION BINOCULARS and assigned to ITT, Inc., the assignee herein.

The T-adaptor 30 is a typical optical adaptor sized to fit the night vision binoculars. The T-adaptor 30 has an externally threaded region 21, a non-threaded mid-region 22 and an expanded region 23 having a threaded interior 24 and a knurled exterior 25. Such T-adapters are commonly used in the prior art to join secondary lens assemblies to optical devices, such as cameras, night vision binoculars and the like. In the shown embodiment, the optical attachment 60, threadably engages the threaded interior 24 of the T-adaptor 30, wherein the T-adaptor 30 optically aligns the optical attachment 60 with the objective lens of the night vision device 20.

The flashlight 40 in the shown embodiment is preferably a small flashlight of a diameter D of less than 2.5 cm that typically holds two AA or AAA batteries. An example of such a flashlight is sold under the brand name MINI-MAGLITE® by Maglite, Inc., however any other brand of flashlight having a similar diameter size could be used. Similarly, an appropriately sized near-infrared illuminator could also be used in place of the flashlight.

Figure 2:
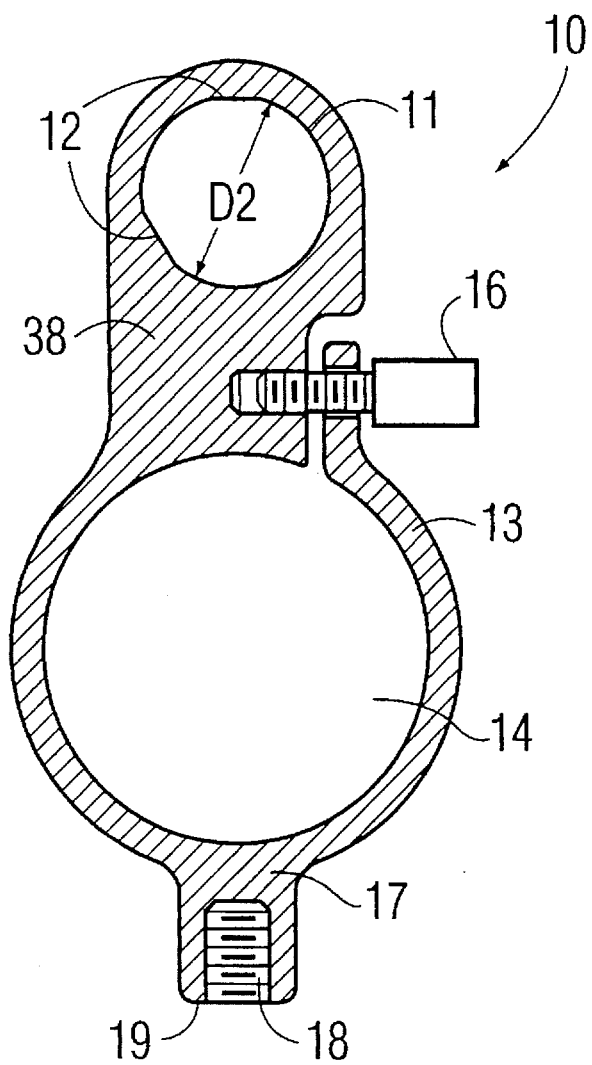
FIG. 2 is a cross sectional view of the embodiment of the present invention shown in FIG. 1.

Referring to FIG. 2 in conjunction with FIG. 1, it can be seen that the bracket assembly 10 defines a flashlight aperture 11 that receives the body of the flashlight 40. The flashlight aperture 11 has a diameter D2 which is slightly smaller than the diameter D of the flashlight 40. Consequently, an interference fit occurs between the flashlight 40 and the bracket 10 when the flashlight 40 is positioned within the flashlight aperture 11. The flashlight aperture 11 may also have flattened edges 12 that further limit the size of the flashlight aperture 11 and create an interference fit. The flattened edges 12 also serve to retard the rotation of the flashlight 40 within the flashlight aperture 11, thereby helping to retain the flashlight 40 in one set position relative to its longitudinal axis.

In the center of the bracket assembly 10 is a circular structure that defines a clamping ring 13. The flashlight aperture 11 is disposed in a rigid element 38 that radially extends from the top of the clamping ring 13. The clamping ring 13 is positioned a short distance below the flashlight aperture 11. The clamping ring 13 defines a generally circular aperture 14 that can be constricted by the tightening of the knurled adjustment bolt 16. When the knurled adjustment bolt 16 is loose, the circular aperture 14 defined by the clamping ring 13 is large enough to surround the mid-region 22 of the T-adaptor 30 (FIG. 1). As the knurled adjustment bolt 16 is tightened, the circular apeture 14 constricts to a size smaller than the mid-region 22 of the T-adaptor 30 (FIG. 1). Consequently, the clamping ring 13 can be tightened to a point where the clamping ring 13 engages the T-adaptor 30 and the bracket assembly 10 is rigidly affixed to the T-adaptor 30.

A block projection 17 extends below the clamping ring 13 on the bracket assembly 10. A threaded bore 18 (FIG. 2) is formed within the block projection 17, having its open end exposed on the bottom surface 19 of the block projection 17. The threaded bore 18 is sized to receive the tripod mount 50 (FIG. 1) or other static support. The threaded bore 18 is sized for receiving the threaded mount 53 of a tripod 50, which is of a standard size used by most cameras, video recorders, telescopes and other optical assemblies. The center of the flashlight aperture 11 and the clamping ring aperture 14 align with the longitudinal axis of the threaded bore 18. As a result, when the threaded bore 18 is held at an orientation where the longitudinal axis of the bore is vertical, the flashlight aperture 11 is at its highest point relative to the clamping ring 13.

Although the shown embodiment describes the bracket assembly 10 as a separate component from the T-adaptor 30, it should be understood that since the bracket assembly 10 engages the T-adaptor 30, the two components can be manufactured as an integral unit or as an inseparable assembly. However, the shown embodiment of a separate adaptor and bracket assembly is preferred because it allows the bracket assembly 20 to be positioned in a generally vertical orientation with respect to the T-adaptor 30 regardless of the rotational position of the T-adaptor 30 as it threadably engages the night vision device. This ensures that the block projection 17 would extend downwardly from the lowest point on the bracket assembly 10 and the threaded bore 18 would be in a proper vertical orientation to accept a tripod mount.

It will be understood that the embodiment of the present invention illustrated and described herein is merely exemplary and a person skilled in the art may make variations and modifications to the shown embodiment without departing from the intended scope of the invention. All such variations and modifications are intended to be includes within the scope of the invention as defined by the appended claims.

What is claimed:

1. A mounting bracket assembly for mounting a flashlight to an optical device, comprising:

a clamping ring defining a first aperture of a predetermined diameter, said clamping ring having a first clamping end and a second clamping end operable to move inward and outward in order to vary said predetermined diameter, said second clamping end having a flange extending therefrom;

clamping means attached to said flange for selectively varying said predetermined diameter of said first aperture, whereby said first aperture is adjustable to engage the optical device;

a first rigid region radially extending from said first clamping end, said first rigid region having a second aperture disposed there through, wherein said second aperture is adapted to receive and retain the flashlight with a friction fit;

said clamping ring and said first rigid region forming a unitarily formed member.

2. The assembly of claim 1, further including a second rigid region radially extending from said clamping ring at a point diametrically opposed from said first rigid region, said second region having a threaded bore therein.

3. The assembly according to claim 2, wherein said clamping ring and said first region form a unitarily formed member with said second region.

4. The assembly according to claim 1, wherein said second aperture is generally circular in shape.

5. The assembly according to claim 1, wherein said second aperture is defined by an opening with at least one flat surface, whereby said flat surface restricts rotational movement of the flashlight in said second aperture.

6. The assembly according to claim 1, wherein said clamping means includes an adjustment bolt with a knurled head.

7. A mounting bracket assembly for mounting a flashlight to an optical device, wherein the optical device has a threaded coupling for receiving optical attachments, said mounting bracket assembly including:

an adaptor having a first portion, a second portion and a third portion, each said portion having a successively increasing diameter, said first portion having a first threaded end adapted to engage the threaded coupling of the optical device and said third portion having a second threaded end adapted to receive the optical attachments;

a bracket having an attachment means associated therewith for selectively attaching to said adaptor at a predetermined orientation relative to said adaptor; and a flashlight receiving means associated with said bracket for receiving and retaining a flashlight.

8. The assembly according to claim 7, wherein said second portion has an unthreaded region.

9. The assembly according to claim 8, wherein said attachment means includes a circular clamp sized to engage said unthreaded region of said adaptor.

10. The assembly according to claim 7, wherein said bracket further includes a means for engaging a tripod.

11. The assembly according to claim 7, wherein said flashlight receiving means is an aperture disposed through a section of said bracket, wherein said aperture engages the flashlight with an interference fit.

12. The assembly according to claim 9, wherein said circular clamp includes an adjustment bolt for adjusting said circular clamp between a first condition where said circular clamp engages said unthreaded region of said adaptor and a second condition where said circular clamp does not engage said unthreaded region of said adaptor.

13. The assembly according to claim 11, wherein said aperture is defines by an opening with at least one flat surface, whereby said flat surface restricts rotational movement of the flashlight within said aperture.

14. The assembly according to claim 1, further including a threaded bore disposed in a bottom surface of said bracket, wherein said threaded bore is sized to receive a static support.

* * * * *